G. C. JENSEN.
TIRE CARRIER.
APPLICATION FILED SEPT. 10, 1917.
1,307,863.
Patented June 24, 1919.
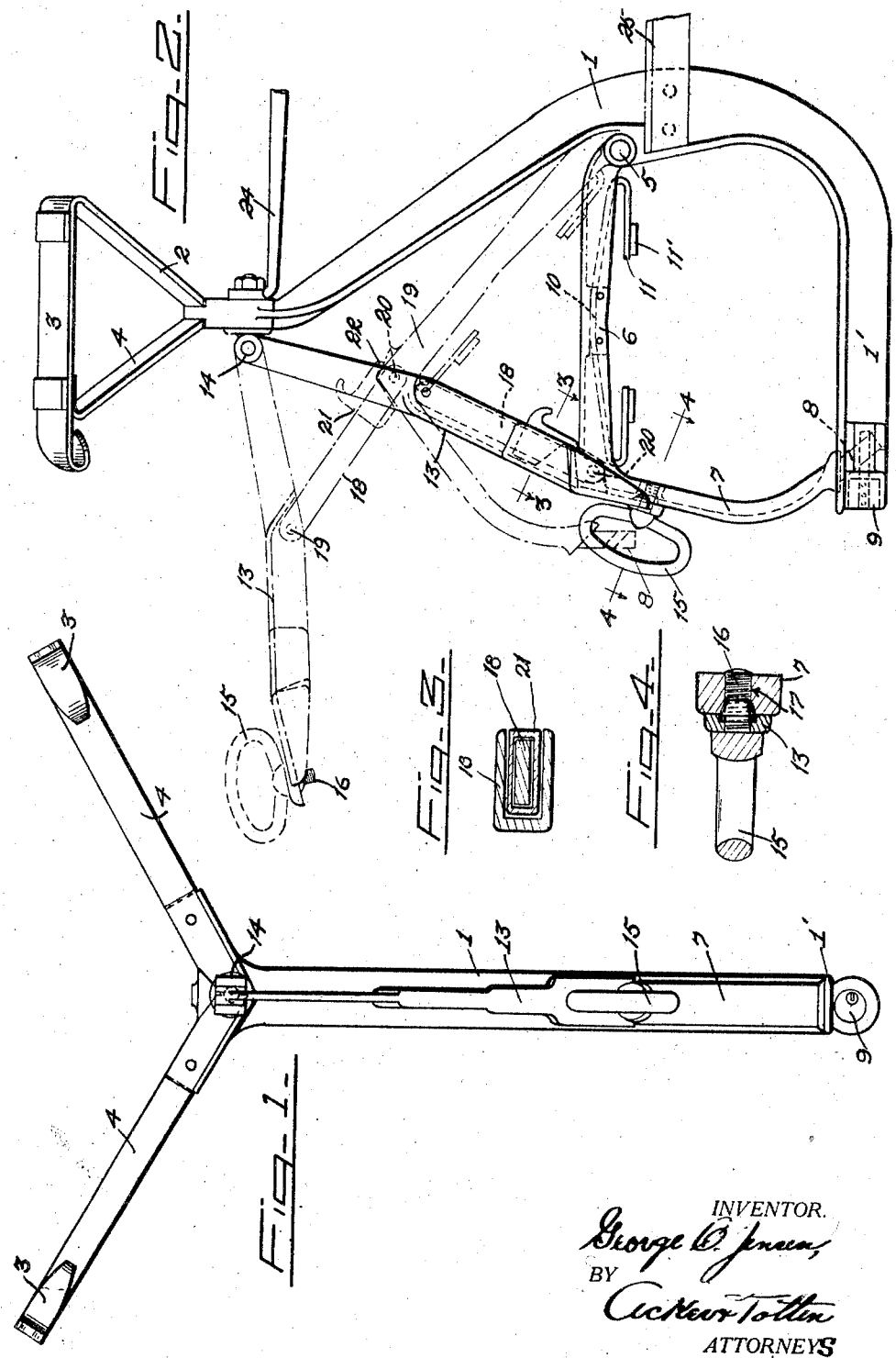
INVENTOR.
George C. Jensen,
BY
Cicklev Totten
ATTORNEYS

UNITED STATES PATENT OFFICE.

GEORGE C. JENSEN, OF OAKLAND, CALIFORNIA.

TIRE-CARRIER.

1,307,863. Specification of Letters Patent. Patented June 24, 1919.

Application filed September 10, 1917. Serial No. 190,428.

*To all whom it may concern:*

Be it known that I, GEORGE C. JENSEN, a citizen of the United States, residing at Oakland, in the county of Alameda and State of California, have invented certain new and useful Improvements in Tire-Carriers, of which the following is a specification.

The present invention relates to improvements in carriers for vehicle tires, particularly that type maintained inflated on a supporting rim.

The invention has for its principal objects to provide a carrier capable of expansion to tightly engage a tire supporting rim to retain the same in position thereon, and provided with a bracket portion for projecting beyond the engaged rim to have locked engagement with a stationary portion, whereby the removal of the tire from the rim, while on the carrier, is prevented; to provide a novel form of operating means for controlling the movement of the fulcrumed rim engaging member, whereby the same is capable of ready movement to open or closed position, and one wherein the rim engaging member is automatically locked in its adjusted position.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in plan of the preferred embodiment of my invention.

Fig. 2 is a view in side elevation, illustrating in dotted lines, the fulcrumed rim engaging member and operating means therefor moved to opened position.

Fig. 3 is a sectional view taken on line 3—3 of Fig. 2, viewed in the direction of the arrows.

Fig. 4 is a sectional view taken on line 4—4 of Fig. 2, viewed in the direction of the arrows.

Referring more particularly to the several views of the drawings, wherein like characters of reference designate corresponding parts,—1 indicates a suitable substantially L-shaped body portion of the tire carrier and from the upper end of the vertical portion of which extend the radial arms 2, each provided with a forwardly bent rim supporting portion 3, which portions lie in a plane parallel to the base 1' of the body member 1.

Braces 4 connecting at one end with the free ends of the rim supporting portions 3 are secured at their opposite ends to the upper end of the body portion 1, as in Fig. 2 of the drawings, and thus provide rigid tire supporting arms. Fulcrumed as at 5 to the body portion 1 at a point above the base 1' thereof and to swing on a horizontal axis, is one end of a clamping arm 6 having a right angularly bent locking portion 7 at its outer end for coöperation with the free end of the base 1' of the body 1. The locking portion 7 carries a bolt 8 for reception within a key controlled lock 9 at the outer end of the base 1' of the body 1 when the clamping arm is swung downwardly to engage the inner surface of the rim of the positioned tire. The clamping arm 6 is preferably formed of channeled material, and in the under portion of the same is positioned the spring member 10 having the bent ends 11 carrying lugs 11' for engaging the rim of the positioned tires to provide a yieldable connection between the same and the clamping arm, and to maintain the rim of the positioned tires tightly in contact with the rim supporting portions 3.

To operate the clamping arm 6 there is employed a link and lever construction including the lever 13 pivotally mounted at its upper end, as at 14, to swing on a horizontal axis, and with the free end thereof disposed to lie parallel with and project for a short distance longitudinally of the locking portion 7. An operating handle 15 having a screw-threaded shank 16 rotatably connected to the free end of the lever 13 provides a means for raising and lowering the lever, and said screw-threaded shank is capable of engagement when the lever is in its lowered position with the locking portion 7 through the threaded opening 17 therein.

The link 18 is pivotally connected as at 19 to the lever 13 approximately midway of its length and pivotally connected at its opposite end as at 20 to the outer end of the clamping arm 8 at its junction with the bent locking portion 7.

Thus it will be apparent that the operation of the lever will raise and lower the clamping arm 8 and its associated locking portion dependent on the direction of movement of said lever. It will also be apparent that by connecting the link, as illustrated, the channeled portion of the lever incloses and protects the fulcrumed points of the link when the lever is in its closed position.

In order to temporarily maintain the lever in its raised position, to permit of the removal of a tire from the carrier, a suitable catch 21 is employed, and the same slides on the link 18 and is provided with a lip or tongue 22 for engagement over the right angle connection of the clamping arm 8 and locking portion 7. The raising of the lever from the full line position in Fig. 2 to the dotted line position, permits the catch 21 to slide downwardly on the link and engage the clamping arm 6, retaining the same in its elevated position, and to permit of the lowering of the clamping arm said catch is moved lineally of the link and away from the clamping arm to disengage the lip or tongue 22 thereof from said arm, and permitting the lowering of the same.

While I have illustrated a tire carrier capable of supporting two tires, it is apparent that said carrier may be constructed to support a single tire with its supporting rim, or any number of tires. The tire support may be attached to a vehicle in any suitable manner, as by the attaching members 24 and 25.

In positioning a tire on a carrier of the type illustrated, the same may be first laid flat on the ground adjacent the base portion 1', the edge adjacent said base portion is then raised to rest thereon and then the opposite edge is swung upwardly onto the supporting portions 3, thus eliminating the lifting of the tire bodily in a vertical plane onto the supporting portions 3.

Having thus described my invention, what I claim as new and desire to protect by Letters Patent is:—

1. A tire carrier comprising a plurality of stationary supporting members, certain of the members adapted for engaging with the rim of the positioned tire to support the same, another of the members extending under the tire on the positioned rim, a clamping member fulcrumed for pivotal movement into engagement with the rim of the positioned tire to draw the same into engagement with the first mentioned supporting members, said clamping member capable of locked engagement at its free end with the supporting member to which it is fulcrumed, a lever, a link connecting said lever intermediate of its ends and said clamping member, and means for securing the free end of the lever to said clamping member when the same is in locked engagement with its coöperating supporting member.

2. A tire carrier comprising a plurality of stationary supporting members, certain of the members adapted for engaging the inner periphery of a positioned tire to support the same, another of the members extending under the outer periphery of the positioned tire at its lowermost point, a clamping member fulcrumed for pivotal movement to engage with the inner periphery of the positioned tire at a point overlying the last mentioned member to draw the tire into engagement with the first mentioned supporting members, a lever, a link pivotally connecting said lever and clamping member, and means for locking the free ends of said clamping member and member extending under the tire in engagement.

3. A tire carrier comprising a pair of stationary supporting members for engaging the inner periphery of a positioned tire, a body member provided with a base portion for extending under the outer periphery of a positioned tire at its lowermost point, a substantially L-shaped clamping member fulcrumed at one end to said body member above said base portion with its free end capable of movement to overlie the inner periphery of a positioned tire for drawing the same into engagement with the first mentioned supporting members, means for moving said clamping member to cause the free end thereof to engage with the outer end of said base portion, and engageable devices at the free ends of said base portion and clamping member for interlocking the same on the movement of said members into engagement.

In testimony whereof I have signed my name to this specification in the presence of two subscribing witnesses.

GEORGE C. JENSEN.

Witnesses:
 HARRY A. TOTTEN,
 D. B. RICHARDS.